UNITED STATES PATENT OFFICE.

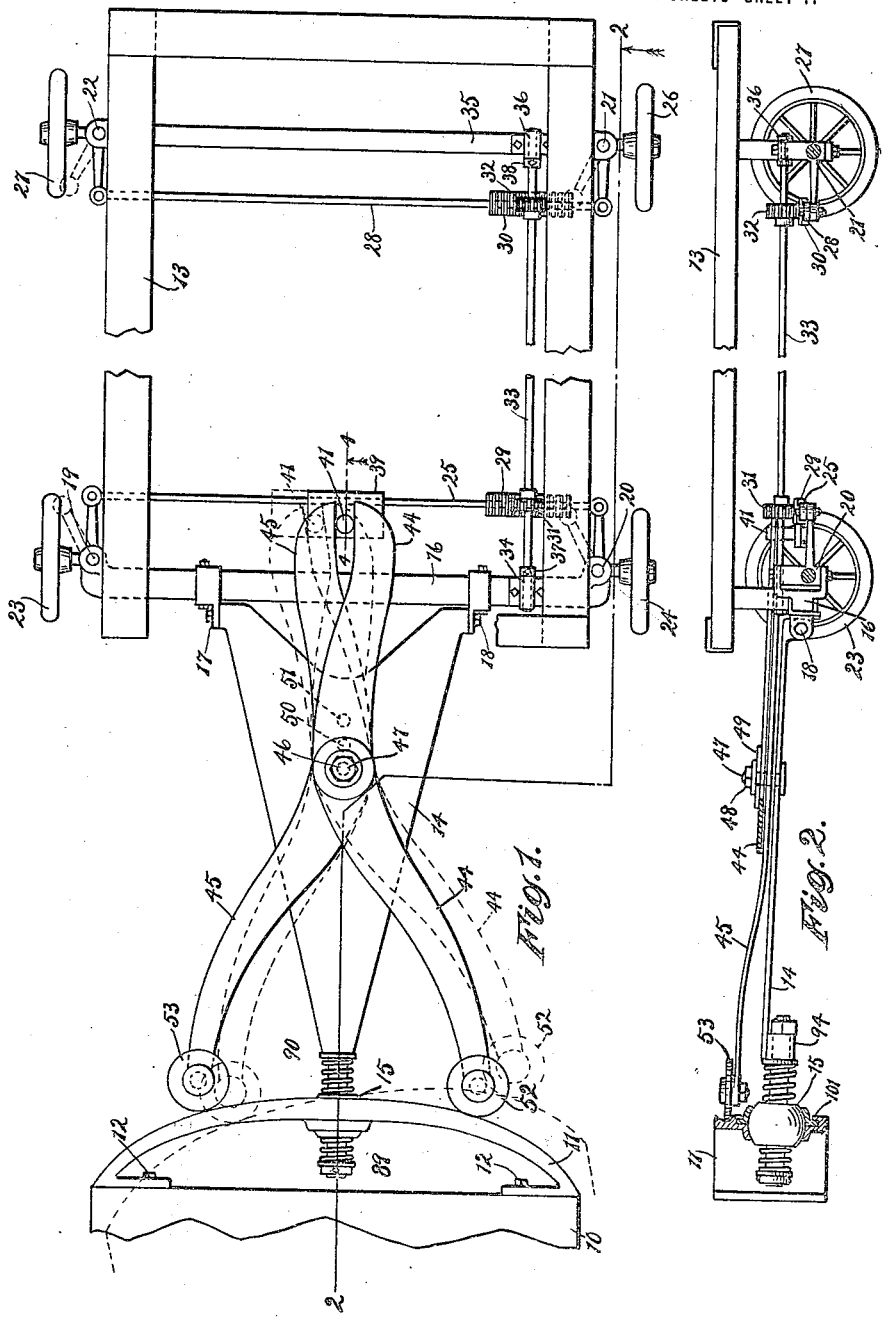

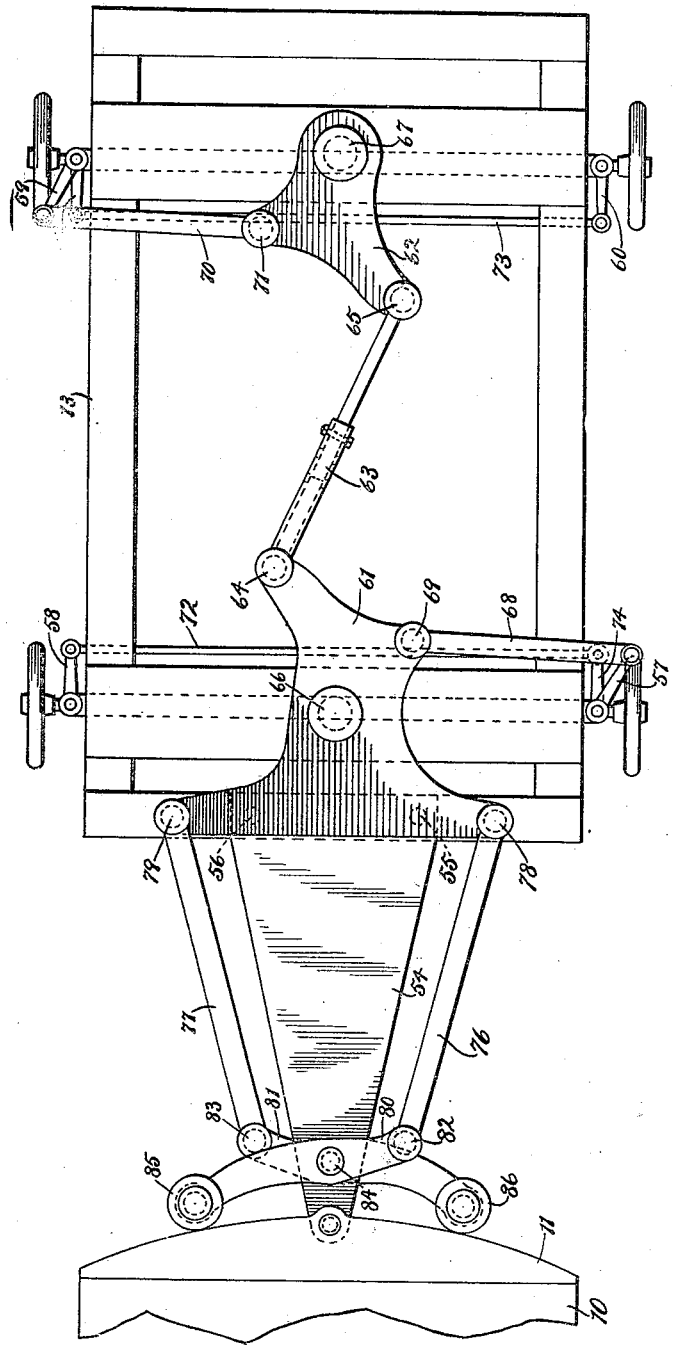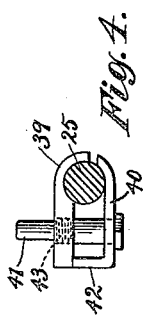

REUBEN H. DE LAUNTY, OF CHICAGO, ILLINOIS.

TRAILER-STEERING DEVICE.

1,422,040. Specification of Letters Patent. Patented July 4, 1922.

Application filed February 24, 1920. Serial No. 360,725.

*To all whom it may concern:*

Be it known that I, REUBEN H. DE LAUNTY, a citizen of the United States, and resident of Chicago, county of Cook, and State of Illinois, have invented certain new and useful Improvements in Trailer-Steering Devices, of which the following is a specification, and which are illustrated in the accompanying drawings, forming a part thereof.

This invention relates to the steering of trailers, and has for an object the provision of means to move the wheels of the trailer to steer the same. A further object is the provision of means to detachably couple the trailer to the propelling vehicle. Other objects will appear from the following description when read with the accompanying drawings showing illustrative embodiments of the invention, and in which—

Fig. 1 is a plan view of a trailer chassis and the rear end of a truck to which the trailer is coupled, with a different position of parts in dotted lines;

Fig. 2 is a central vertical section on line 2—2 of Fig. 1;

Fig. 3 is a plan view similar to Fig. 1, showing a modified form;

Fig. 4 is a vertical section on the line 4—4 of Fig. 1, drawn to an enlarged scale;

Figure 5:
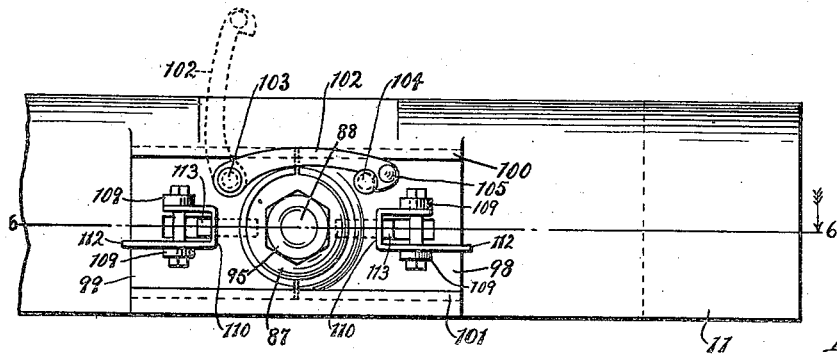
Fig. 5 is a rear elevation of the coupling device, with the trailer tongue and steering device removed.

The rear end of a truck frame is indicated at 10, to which frame the device embodying the invention is shown as attached for the purpose of drawing a trailer by power of the truck.

For the purpose of attachment of the trailer to the truck body 10 there is shown an arcuate frame attachment, as 11, rigidly secured to the truck frame, as by bolts or rivets 12. This frame 11, when in place, becomes in reality a part of the truck body, and if desired the rear transverse member of the frame of the truck body may be made of the form shown at 11, in which case a superposed frame member will be unnecessary. The added frame member 11 is illustrated for the purpose of showing the application of the invention to existing trucks, but will be claimed as part of the truck body. To haul the trailer 13 a draw-bar 14 is shown as detachably secured to the frame 11 by a coupling 15, and to the front axle 16 of the trailer by connections 17, 18.

The trailer is shown as provided with a four wheel steering device, each individual wheel being controlled by a steering knuckle, as 19, 20, 21, 22. The steering knuckles 19, 20, of the front wheels 23, 24, of the trailer are shown as connected by a bar 25, and the knuckles 21, 22, of the rear wheels 26, 27, by a bar 28.

To cause the knuckles 19, 20, 21 and 22 to move the wheels simultaneously, the bars 25 and 28 are each provided with a rack, as 29 and 30, each rack coacting with a pinion, as 31, 32, keyed to a shaft 33, which shaft is shown as journaled on the front axle 16 at 34, and on the rear axle 35 at 36, for free rotation. Collars 37, 38, are shown as secured to the shaft 33, to prevent endwise movement. As the knuckles swing the bars 25 and 28 will each have a motion longitudinal of the trailer, in addition to that lateral thereof, and the racks 29, 30, are shown as being formed wider than the face of the pinions 31, 32, to prevent separation therefrom. As the front bar 25 is positively moved to move the front steering knuckles 19 and 20, the rack 29 will rotate the shaft 33 through pinion 31, and, by means of pinion 32 and rack 30, will move bar 28 to actuate the steering knuckles 21, 22, to move the rear wheels 26, 27, in the proper direction.

The racks 29, 30, are shown as being wider than the pinions 31, 32, to prevent separation of rack and pinion when the rods 25 and 28 move laterally of their shown positions or longitudinally of the trailer due to the motion in an arc of a circle of the steering knuckles.

To move steering bar 25 a clip comprising two members 39, 40, shown more specifically in Fig. 4, may be secured to the bar, said clip bearing a pin 41 for application of power to the bar 25. Pin 41 may be threaded in a portion of its length, and may serve as a bolt to clamp the clips 39, 40, to the bar, a portion 40 of the clip having an angular projection 42 to bear against member 39, which latter has a threaded aperture, at 43, for coaction with the thread on pin 41. Pin 41 is shown as engaged by the ends of a pair of levers 44, 45, which levers may be pivoted, as at 46, upon a bolt 47 passed through both levers and through the draw-bar 14, and provided with a nut 48 and washer 49. Preferably a plurality of holes, as 50, 51, will be provided through both the levers 44, 45, and through draw-bar 14, which holes, as shown, will be at all times in alignment when the parts are central.

The pivot bolt 47 may be placed in the desired one of these holes to provide the amount of movement of steering mechanism desired in a particular combination of truck and trailer. The effect of moving pivot 47 to the rear is to shorten the rear end of levers 44, 45, and lengthen the front end thereof so as to cause the pin 41 to move a less distance for a given movement of the front end of the levers 44, 45.

To cause movement of levers 44, 45, when the draw-bar 14 pivots about its connection with the arcuate member 11, the forward ends of the levers 44, 45, are adapted to engage with said member 11 thereby moving said levers about pivot 47, as indicated by the dotted lines in Fig. 1. Preferably anti-friction rollers, as 52, 53, are provided on the ends of levers 44, 45.

Change of angular relation between the truck frame 10 and draw-bar 14 will cause a corresponding movement in the wheels of the trailer, so as to cause the latter to travel in the path of the truck.

In the modification of Fig. 3 the invention is shown applied to a known form of four-wheel steering mechanism. The arcuate member 11 is shown attached to a truck body, as in Fig. 1. The draw-bar 54 is shown as attached to the member 11 for angular movement in a horizontal plane, and as attached to the trailer at 55, 56.

To actuate the steering knuckles 57, 58, 59 and 60, in this form of the device, plates 61, 62, are shown as pivoted one above each axle, and an adjustable arm 63 is shown as connecting projections 64 and 65, one on each plate, whereby said plates will be caused to move about their pivots 66, 67, in unison. An arm 68 is shown as pivoted to plate 61 at 69, and as connected to steering knuckle 57, and a similar arm 70 connected to plate 62 at 71, and to knuckle 59. Knuckles 58 and 60 may be controlled by connecting bars 72 and 73, connecting said knuckles with supplementary knuckle arms 74 and 75.

To actuate plate 61 connecting bars 76 and 77 are shown pivotally attached to plate 61, as at 78 and 79, and to levers 80, 81, at 82 and 83. Levers 80 and 81 are shown as pivoted to draw-bar 54 at 84, and as bearing on arcuate member 11 through the medium of anti-friction rollers 85 and 86.

Change in angular relation between truck 10 and draw-bar 54 will cause one of the levers 80, 81, to push upon connecting bars 76 or 77 to swing plates 61 and 62, whereby the wheels of the trailer will be properly moved and controlled.

Figure 6:
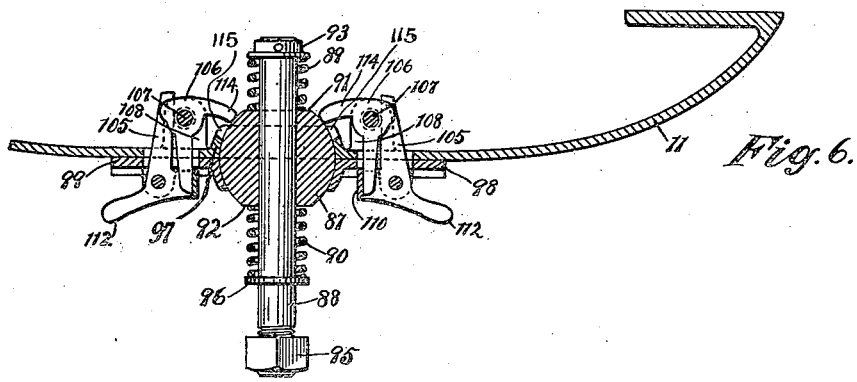
Fig. 6 is a horizontal section on the line 6—6 of Fig. 5.
Figure 7:
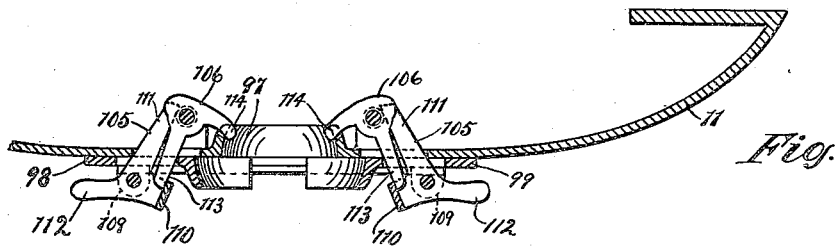
Fig. 7 is a view similar to Fig. 6, with the clutch open and the trailer connection removed.

The coupling 15 is shown in detail in Figs. 5, 6 and 7, and is designed to provide for a universal movement of the draw-bar about the coupling. To this end the draw-bar may be equipped with a ball 87, which, for purposes of connection to the draw-bar, is bored and has a rod 88 reciprocable therein. To lessen shocks spiral springs 89, 90, are provided. The ball is shown as flattened at 91, 92, to provide seats for the springs. Spring 89 bears against flattened portion 91 and against head 93 on rod 88, which, as shown, may be in the nature of a collar pinned to the rod adjacent its end. The rod 88 may be connected with the draw-bar 14 by passing through a perforated lug 94, and may be secured therein by means of a nut 95. Preferably a washer 96 is slipped on the rod 88 to serve as an abutment for the spring 90, which bears at its forward end against the flattened portion of the ball 87. Spring 89 will cushion draft shocks, and the spring 90 buffing shocks.

For transmission of buffing stresses to the truck, the frame 11 is shown as provided with an opening surrounded by a socket 97, whose interior surface is a zone which will fit upon the ball 87. To transmit draft stresses between the frame 11 and the draw-bar, two plates 98, 99, are provided, each plate sliding in ways 100, 101, and each plate carrying one-half of a socket which, when the plates are together, is a duplicate in shape and size of the socket 97. If the ball 87 be entered into socket 97 and plates 98, 99, be moved together and latched to prevent their separation, movement of the truck will be imparted to the draw-bar and trailer. A latch to hold the plates together or shut is shown at 102, pivoted at 103 on plate 99, and catching over a stud, as 104, on plate 98. A handle, as 105, may be supplied for manipulation of the latch, if desired. When the ball 87 is locked in the socket, as shown in Fig. 6, if the latch 102 be thrown to the dotted line position of Fig. 5 and the truck be then started forward, the plates 98, 99, will be forced apart by the ball and the trailer will be automatically uncoupled from the truck.

To render the act of coupling automatic, a pair of coacting levers 105, 106, are shown for each of the plates 98 and 99. Levers 106 may be pivoted, as at 107, on lugs 108 projecting from frame 11, and levers 105 are shown as pivoted on lugs 109 projecting from plates 98, 99. Levers 105 are shown as each formed with a loop 110, an arm 111, and a handle 112. Levers 106 are shown as each formed with an arm 113, projecting into loop 110, and with an arm 114. For reception of the ends of arms 114 the socket 97 is shown as slotted at diametrically opposite points, as at 115, (Fig. 6).

With the plates 98 and 99 opened to the position shown in Fig. 7, the ends of arms 114 of levers 106 will project into the socket 97, as shown. If the driver of the truck 10 now backs the truck to a position just free of the end of the draw-bar, and then raises the draw-bar and supports it in alignment with the socket 97, he may then get into his seat and back the socket into engagement with the ball 87. Contact of the ball with the ends of arms 114 will slide the plates 98, 99, to the position shown in Fig. 6, when, if the latch 102 was left in a horizontal position, it will ride up over the stud 104 and automatically lock the plates together. If the latch fails to catch the driver may, by manipulation of handles 112, force the plates closer together to enable the latch to be swung to place over stud 104.

In addition to cushioning draft and buffing shocks the springs 89, 90, have an important function in co-action with levers 44 45, since in backing the yield of spring 90 causes these levers to grip pin 41 and when the rear end of the truck is cut around by steering the great leverage of member 11 on one or the other of the levers 44, 45, makes the resilient connection of the draw bar almost essential.

Many changes may be made in the physical embodiment of my invention without departing from the spirit thereof.

I claim as my invention—

1. In a trailer steering device, in combination, a truck having an arcuate extension at its rear end, a trailer having steerable wheels, and means slidably engaging said arcuate extension operative upon lateral change of angular relation between the truck and trailer for steering said wheels.

2. In a trailer steering device, in combination, a truck having an arcuate extension at its rear end, a trailer, steerable front and rear wheels, a draw-bar for said trailer adapted to be pivotally attached to the truck, and means slidably engaging said arcuate extension operative upon change of angular relation between the truck and trailer for steering said wheels.

3. In a trailer steering device, in combination, a trailer, steering mechanism for said trailer, a truck having an arcuate rear frame member, a draw-bar attached to said trailer and to said truck for swinging movement relative to the latter, a pair of levers pivotally mounted on said draw-bar, said levers having forwardly extending arms diverging for coaction with said arcuate member, one at each side of said draw-bar attachment, and rearwardly extending diverging arms, means whereby said rearwardly extending arms control said steering mechanism upon angular change of relation between the draw-bar and the truck.

4. In a trailer steering device, in combination, trailer steering mechanism comprising a vertical pin, a draw-bar adapted to swingingly connect said trailer to a truck, a pair of levers pivoted on said draw-bar having forwardly extending arms diverging to coact with the rear end of a truck on opposite sides of the draw-bar attachment, and rearwardly extending arms diverging to coact with said vertical pin on opposite sides thereof, whereby angular change between said draw-bar and truck will actuate said steering mechanism by means of one of said levers.

5. In a trailer steering device, in combination, a trailer having steerable wheels, a draw-bar connected to said trailer, a truck having an arcuate extension, a universal joint coupling between said draw-bar and truck, and means slidably engaging said arcuate extension for controlling said wheels, operable upon lateral change of angular relation between said truck and draw-bar.

6. In a trailer steering device, in combination, a trailer having steering wheels, a draw-bar connected to said trailer, a truck having a transverse arcuate rear extension, a universal joint coupling between said draw-bar and said truck comprising a socket on said truck, a ball on said draw-bar, means to cushion shocks between said ball and draw-bar, and means engaging the arcuate extension for controlling said wheels, operable upon lateral change of angular relation between said truck and draw-bar.

7. In a trailer steering device, in combination, a trailer adapted to be connected to the rear of a truck, steerable wheels on said trailer, an arcuate track at the rear of said truck, rollers engaging the arcuate track, means carrying said rollers operative upon lateral change of angular relation between said truck and said trailer for steering said wheels.

8. In a trailer steering device, in combination, a trailer having connected steerable front and rear wheels, a draw-bar adapted to be pivotally attached to a truck, and means pivotally mounted on the draw-bar and having slidable engagement with the rear of said truck operative upon lateral change of angular relation between the trailer and truck for steering said wheels.

9. In a trailer steering device, in combination, a trailer adapted to be connected to the rear of a truck, a transverse arcuate extension on the rear of said truck, a draw-bar pivotally connected to the said arcuate extension and attached to the front axle of said trailer, a pair of steerable wheels mounted on knuckles on the front axles of said trailer, a connecting rod between the said knuckles, a pair of scissor-like levers, pivoted on said draw-bar, the forward ends of said levers bearing rollers operatively engaging said arcuate member, and the rear ends of said levers engaging said connecting rod, whereby said wheels are steered on change of angular relation between said truck and said trailer.

10. In a trailer mechanism, in combination, a trailer adapted to be connected to the rear of a truck, steerable wheels on said trailer, a connecting rod between said wheels, a draw-bar between said truck and said trailer, a transverse arcuate extension on the rear of said truck, a pair of hinged levers mounted on said draw-bar, the front ends of said hinged levers bearing rollers engaging said arcuate track, the rear ends thereof operatively engaging said connecting rod, whereby a swinging of said arcuate member effects a steering of said wheels.

REUBEN H. DE LAUNTY.